(12) United States Patent
Dimmer (10) Patent No.: US 6,568,740 B1
(45) Date of Patent: May 27, 2003

(54) COVER SYSTEM FOR TRUCK BOX WITH FASTENING MEANS

(75) Inventor: Jerry R. Dimmer, Yankton, SD (US)

(73) Assignee: Shur Company, Yankton, SD (US)

( * ) Notice: Subject to any disclaimer, the term of this patent is extended or adjusted under 35 U.S.C. 154(b) by 0 days.

(21) Appl. No.: 10/001,384

(22) Filed: Oct. 31, 2001

(51) Int. Cl.[7] ................................................ B60P 7/02
(52) U.S. Cl. ............... 296/100.16; 296/98; 296/100.11; 296/100.12
(58) Field of Search ....................... 296/100.01, 100.11, 296/100.12, 100.13, 100.15, 100.16, 98

(56) References Cited

U.S. PATENT DOCUMENTS

| | | | | |
|---|---|---|---|---|
| 4,739,528 A | * | 4/1988 | Allen .................... | 296/100.15 |
| 5,076,338 A | * | 12/1991 | Schmeichel et al. ... | 296/100.16 |
| 5,251,951 A | * | 10/1993 | Wheatley ............... | 296/100.16 |
| 5,365,994 A | * | 11/1994 | Wheatley et al. ...... | 296/100.15 |
| 5,788,315 A | * | 8/1998 | Tucker .................. | 296/100.01 |
| 5,906,407 A | * | 5/1999 | Schmeichel ............ | 296/100.15 |
| 6,234,561 B1 | * | 5/2001 | Huotari ................. | 296/100.15 |
| 6,257,647 B1 | * | 7/2001 | Ninness et al. ........ | 296/100.15 |
| 6,293,608 B1 | * | 9/2001 | Dicke et al. ........... | 296/100.15 |
| 6,322,129 B2 | * | 11/2001 | Huotari ................. | 296/100.15 |

OTHER PUBLICATIONS

Velcro USA Inc. Product Information Guide; "Soft Hardware Fasteners" (2 pages) Dec., 1999.

* cited by examiner

*Primary Examiner*—D. Glenn Dayoan
*Assistant Examiner*—Greg Blankenship
(74) *Attorney, Agent, or Firm*—Jones Day (57) ABSTRACT

A fastening system for a flexible cover system for a truck box includes a first fastening material on the side edges of the flexible cover and a second fastening material that releasably engages with the first fastening material. The second fastening material comprises a fastening surface bonded to a substantially rigid elongated slat, and is slidingly received in channel portions of side rails mounted on the sides of the truck box. The first fastening material can be one member of a hook and loop type fastener and the second fastening material can be the mating member of the hook and loop type fastener.

10 Claims, 6 Drawing Sheets

COVER SYSTEM FOR TRUCK BOX WITH FASTENING MEANS

BACKGROUND OF THE INVENTION

This invention relates to a cover system for an open compartment. In particular, the invention relates to a cover system suitable for covering the open box, or cargo compartment, of a pick-up truck.

It is known in the art to provide a cover made of a flexible material and adapted to cover the box of a pick-up truck or the like, to protect the contents thereof from the elements. Such a cover can be made of fabric, flexible plastic, or other sheet material. The cover is commonly secured to a metal frame on the edge of the box with a method of reversible attachment. Because pick-up trucks typically are used and stored outdoors, the fabric and the means of attachment of the fabric to the frame are exposed to the elements which can include heavy moisture and extreme heat and cold, as well as dust, mud, rocks and other materials transported in the box.

The exposure to the elements creates problems for the covering and the structure used to reversibly attach the cover to the frame. Efforts to use convenient structures for attaching the cover to the metal structure tend to be subject to exposure to the elements and wear from repetitive use of the attachment means under those conditions. Moreover, exposure to heat and cold cause the covering to expand and contract, making the cover either loose and wrinkled in appearance, or making it difficult to secure the covering in the closed position.

A prior art attachment design for convenient reversible attachment of the covering to the frame uses a hook and loop fastening system sold under the trademark VELCRO®. In this system, strips of hook-bearing material are adhesively attached to a metal frame secured to the upper edges of the side of the truck box. Strips of loop-bearing material are permanently affixed to the downwardly facing surface of the cover material at its side edges opposite the metal frame. When the cover material is aligned over the truck box, and the strips of loop-bearing material on the downwardly facing side edges of the cover are pressed into contact with the strips of hook-bearing material adhesively fixed to the outer walls of the frame, such that a reversible yet secure mating is obtained. Although this system works well when first installed, it suffers from deterioration over time due to the repetitive pulling on the VELCRO® material attached to the frame in a direction away from the frame, particularly because it also is exposed to the elements. Specifically, the adhesive that attaches the hook-bearing strips to the frame will deteriorate over time because of the pulling motion which occurs when the cover is detached from the frame, and because of exposure to sun, moisture, and extreme temperature fluctuations. Moreover, heat or cold can cause the length and width dimensions of the cover and the frame to expand and contract, causing stresses in the adhesive bond of the VELCRO® material to the frame even when the cover is secured over the box.

It is thus one object of the invention to provide an attachment system for use with a cover for a truck box that provides a reversible yet secure attachment of the cover to the box, but will be resistant to deterioration as a result of repeated removal of the cover from the frame and exposure to the elements.

It is still another object of the invention to provide an attachment system for use with a cover for a truck box that provides an easily attachable and detachable covering without the prior art disadvantages of deterioration over time as a result of stresses applied during use.

SUMMARY OF THE INVENTION

In one inventive aspect of the disclosed subject matter, a cover system for a truck box or open top container is provided comprising a flexible cover material of approximately the same dimensions as the opening of the truck box or container, the flexible cover material having first fastening means in the form of strips of loop-bearing material fixedly attached at its sides, side rails capable of being mounted generally along the upper edges of the side walls of the truck box, each said side rail having an outwardly facing surface defining a channel portion, and second fastening means being in the form of substantially rigid strip members having strips of hook-bearing material bonded thereto, said substantially rigid strip members being receivable in laterally sliding engagement in said channel portions of said side rails, and obstructed from sliding out.

The foregoing system eliminates the adhesive mounting of the second fastening means directly to the frame at the edge of the truck box, as in prior art systems. By eliminating the adhesive holding one portion of the hook and loop fasteners to the frame, the instant invention eliminates wear problems associated with the repeated force of separating the hook portion from the loop portion of the connectors, and with poor initial and long term adhesion and weathering.

Another inventive feature of the disclosed cover system for an open top container or truck box comprises a flexible cover of approximately the same dimensions as the container or truck box, said flexible cover having a front edge and a rear edge, said front edge of said flexible cover being affixed to a front header apparatus, said front header apparatus spanning the width of said truck box or open top container and being adjustably mounted at the front end thereof, said rear edge of said flexible cover being permanently affixed to a rear header apparatus, said rear header apparatus spanning the width of said truck box or open top container and capable of being releasably secured to said rear end thereof, and an adjustable tension control assembly that provides a forwardly biased force against said front header apparatus to urge said front header toward the front of the truck box or open container so as to maintain said flexible cover material in a taut condition, or to relieve stress due to contraction of the cover.

In one embodiment, the side rails are in the form of aluminum extrusions that provide channel portions to receive said second fastening means and support members for supporting said front header apparatus, said rear header apparatus, and said tension control assembly.

DESCRIPTION OF THE FIGURES

The following detailed description of the invention can be better understood with reference to the accompanying drawings, wherein.

DETAILED DESCRIPTION OF A PREFERRED EMBODIMENT

Figure 1:
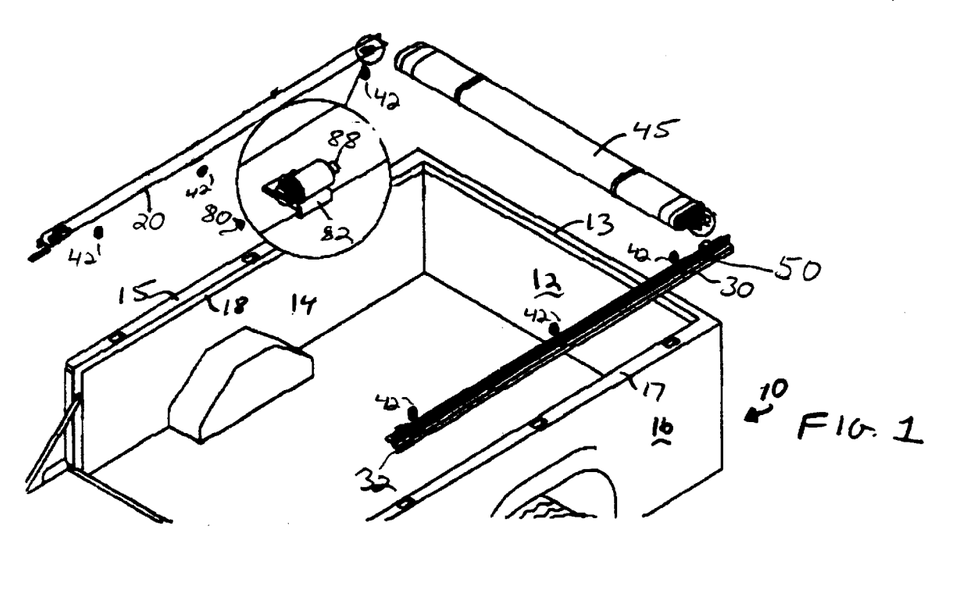
FIG. 1 is an exploded perspective view of a cover system in accordance with the instant invention, with the flexible cover and front and rear header illustrated in a rolled-up condition.
Figure 2:
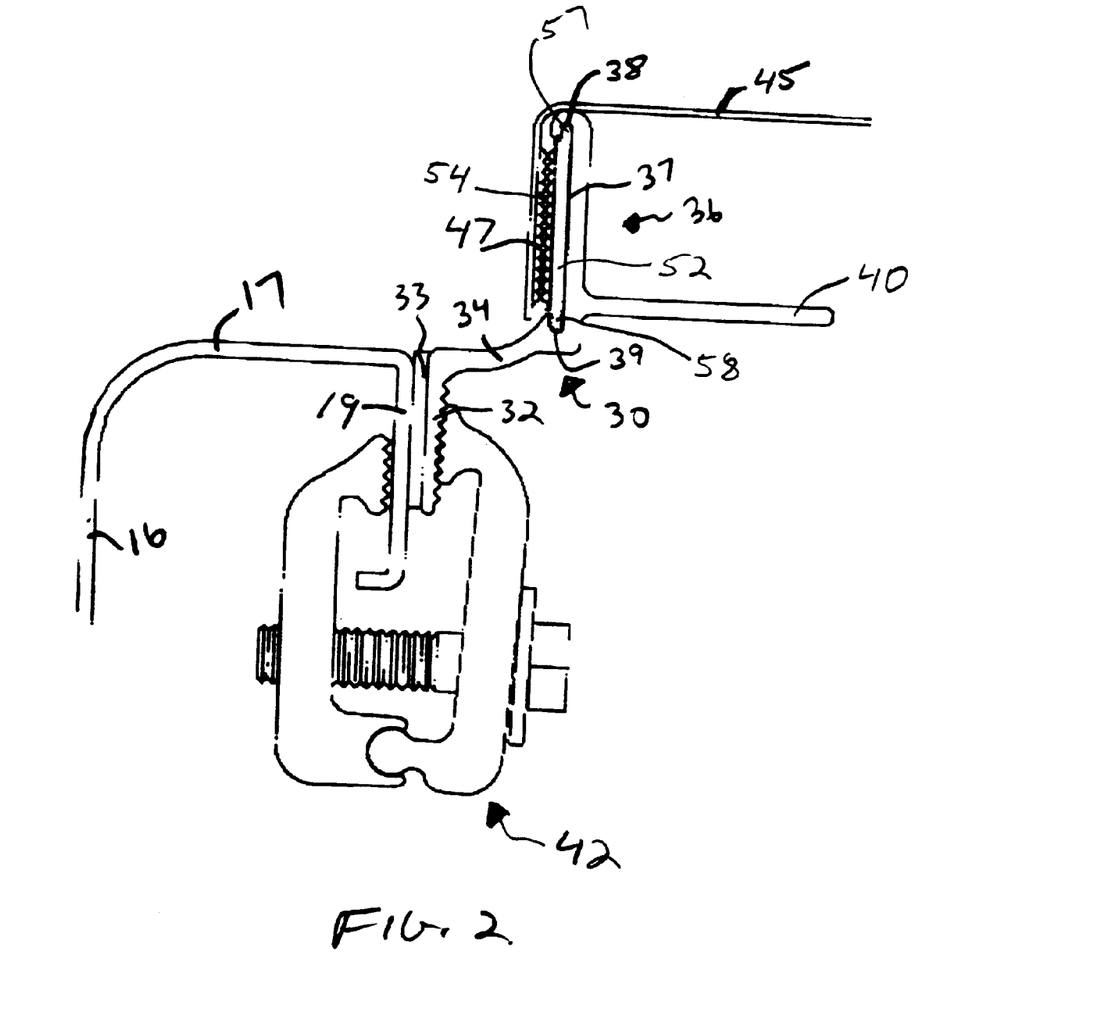
FIG. 2 is a side cross-sectional view of a side rail mounted on a rim of a truck box in accordance with the instant invention.

As illustrated in FIG. 1, a truck box 10 as is well-known in the art comprises a front wall 12 having a top rim 13, and side walls 14, 16 having top rims 15, 17, said rims having inwardly facing downwardly extending lips 18, 19, respectively. Mounted on side wall top rims 15, 17 are side rails 20, 30, respectively. Side rail 30 will be described in detail, it being understood that side rail 20 is a substantially identical mirror image of side rail 30. As seen in FIG. 2, side rail 30 comprises vertical depending flange 32 of similar dimension to downwardly extending lip 19 and adapted to abut thereto. A resilient rubber or rubber-like seal 33 such as a strip of weather-proofing material can be disposed between downwardly extending lip 19 and vertical depending flange 32 to provide sealing and slip-resistant contact. While side rail 30 can be mounted to downwardly extending lip 19 of truck side wall 16 by known mechanical means such as bolts, rivets, screws, and the like, a preferred mounting means comprises a plurality of C-clamps, 42, which do not require holes to be drilled or punched in either lip 19 or side rail vertical flange 32.

Vertical depending flange 32 is connected by shoulder 34 to channel portion 36. Channel portion 36 comprises outwardly facing substantially flat surface 37, terminating at its upper longitudinal edge at curved surface 38 and terminating at its lower longitudinal edge at curved surface 39. The surfaces 37, 38, 39 together define a channel capable of receiving a member in the configuration of an elongated slat. Channel portion 36 is shown as substantially vertical, although it can also be in an inclined configuration. Extending inwardly from the lower inwardly facing surface of channel portion 36 is horizontal support flange 40, discussed in greater detail below.

Side rail 30 is preferably made by extrusion, and preferably is made of a strong, lightweight, rustproof material. Anodized aluminum has been found suitable for this purpose; certain strong plastics may also find utility herein.

FIG. 2 generally illustrates flexible cover material 45 having first fastening means 47 disposed along the downwardly facing side edges thereof. First fastening means 47 preferably comprises strips of loop bearing material permanently affixed to flexible cover material 45 by means such as stitching, adhesives, chemical bonding, fusion, and the like.

Figure 3:
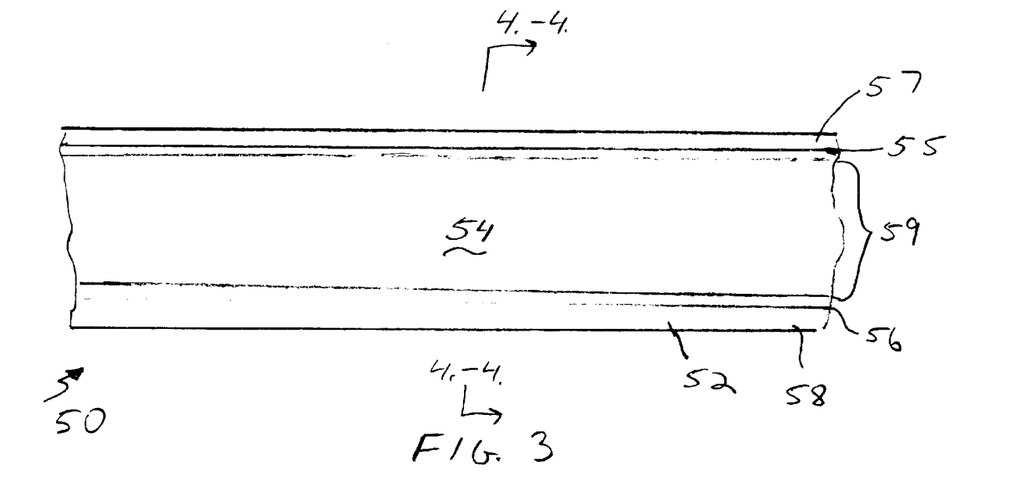
FIG. 3 is a front elevation view of a segment of a second fastening means capable of being mounted on a side rail of the instant invention.
Figure 4:
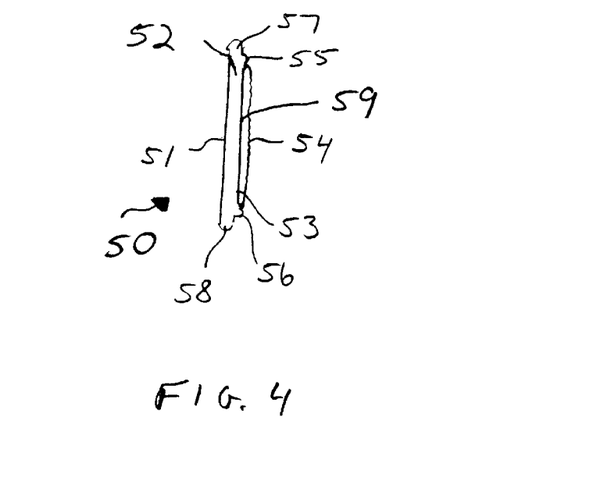
FIG. 4 is a view along line 4—4 of FIG. 3.

Further in accordance with the invention, and as illustrated in FIGS. 3 and 4, second fastening means 50 comprises somewhat rigid elongated slats 52 having a rear surface 51 and a front surface 53. Integrally formed on front surface 53 are longitudinally extending ridges 55, 56 which define surface 53 into end shoulders 57, 58 and central slot 59. A strip of hook-bearing material 54 is permanently affixed to central slot 59, such as by adhesives, chemical bonding, thermal fusion, or the like. Elongated slats 52 are sized and dimensioned such that shoulders 57, 58 are received in sliding engagement by curved surfaces 38 and 39 of said channel portion 36. Somewhat rigid, elongated slats 52 already having hook-bearing material 54 permanently attached to a surface thereof are commercially available in roll-form from VELCRO USA. It is believed that resilient or rigid products having fastening hooks are sold by VELCRO USA under the trademark SOFT HARDWARE. Suitable lengths of second fastening means 50 are cut from the roll and slid into channel portions 36. If desired, the second fastening means 50 can be further secured within channel portion 36 by simple mechanical means such as a single pop-rivet disposed at about the longitudinal center of channel portion 36. In this manner, both second fastening means 50 and channel portion 36 can undergo expansion and contraction due to fluctuations in ambient temperature without warping, bending, or otherwise distorting the substantially flat configuration of second fastening means 50.

To use the cover system of the invention, the flexible cover material 45 starts in a rolled-up position adjacent front wall 12 of truck box 10 as shown in FIG. 1. A front header apparatus, discussed in greater detail below, connects the front edge of flexible material 45 to the top of front wall 12. The user unrolls the flexible cover material 45 from the front of the truck box to the rear of the truck box. The rear edge of the flexible material 45 is connected to a rear header apparatus that snaps into a locking mechanism at the rear of the truck box, as is known in the art. After the rear header apparatus is locked into place, the user simply presses first fastening means 47 located at the side edges of the downwardly facing surface of flexible material 45 against second fastening means 50. First fastening means 47 and second fastening means 50 will engage one another to provide a weatherproof seal without gaps that will protect the contents of truck box 10 from rain, wind, and blowing debris. To remove the cover, the rear header apparatus is unsnapped from the rear locking mechanism and the flexible cover material 45 is simply rolled up toward the front of the truck box. There is no need to detach first fastening means 47 from second fastening means 50 prior to rolling up flexible material 45. The rolling action of the flexible material 45 creates a lifting force that serves to detach first fastening means 47 from second fastening means 50 at the point at which the flexible material 45 is being rolled along its length. Advantageously, the fastening system of the instant invention maintains that portion of flexible material 45 that has not yet been rolled up in a taut condition. This facilitates rolling of the flexible material into a neat, tightly wound roll that is easily stored.

Although the invention has been described herein with the hook-bearing material mounted on the frame and the loop bearing material mounted on the flexible cover, the roles of the hook and loop bearing materials could be reversed and the system would achieve substantially the same effect.

Figure 5:
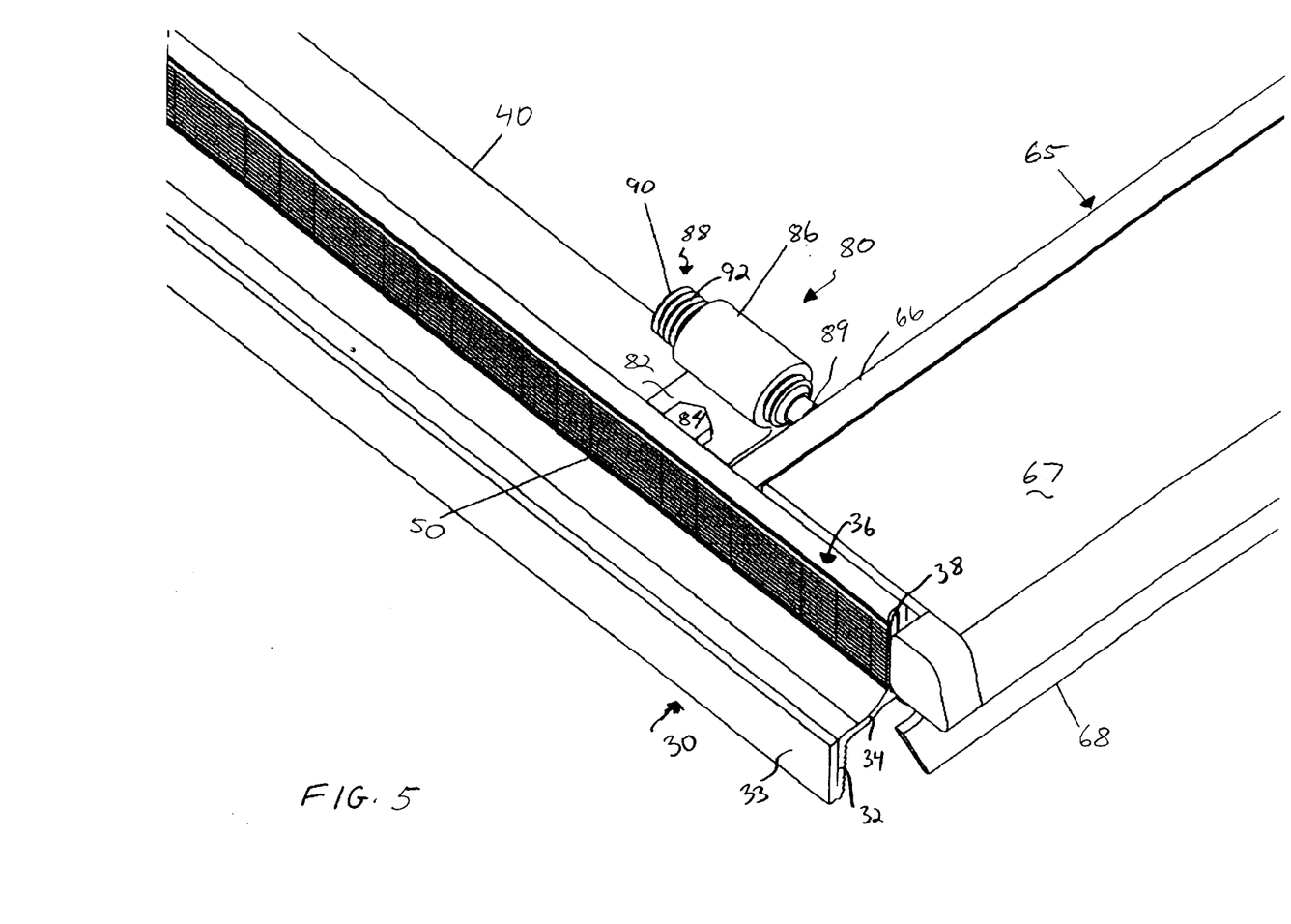
FIG. 5 is a perspective view of the right front corner of the cover system of the invention without the flexible cover, showing the side rail, the front header apparatus, and the tension control assembly.
Figure 6:
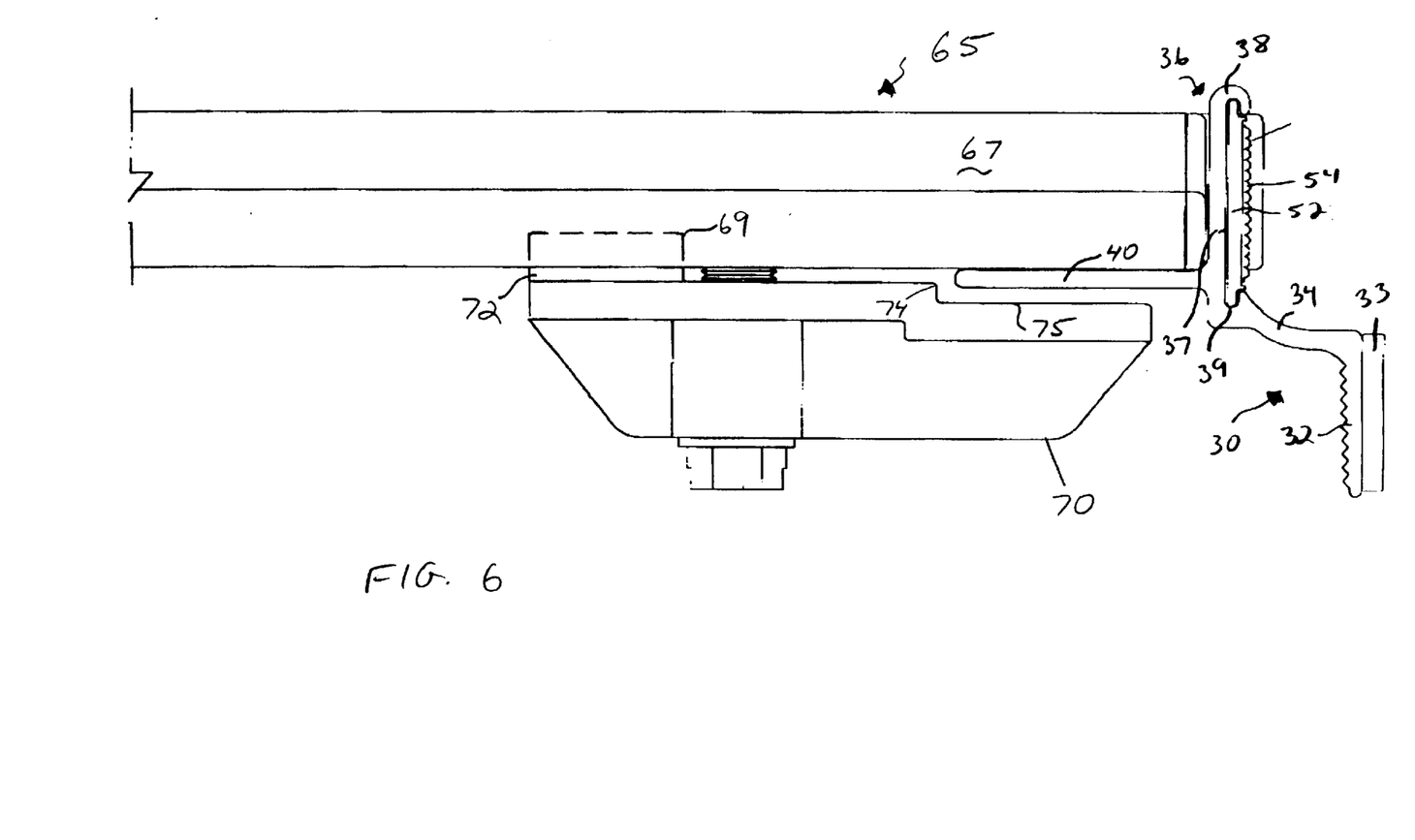
FIG. 6 is an elevation view of a front header apparatus showing the header guide with respect to the side rail.

Another aspect of the invention relates to a means for maintaining the flexible cover material in a taut condition when it is covering the truck box. The front edge of flexible material 45 is permanently affixed to front header apparatus 65, which extends substantially the full width of truck box 10. Front header apparatus 65 includes front header body 67 which is preferably made of a lightweight, strong, rustproof material such as aluminum or certain plastics. Anodized aluminum is preferred. The front end of front header body 67 is provided with header seal 68, which can be made of a resilient rubber or rubber-like material such as weatherstripping material. Header seal 68 is sufficiently resilient to provide a constant seal between front header apparatus and top rim 13 of front wall 12 of truck box 10, as the position of front header body is longitudinally adjusted as discussed below. In the illustrated embodiment, the lateral edge areas of the bottom surface of front header body 67 rest on the top surface of support flanges 40 of side rails 20, 30. The bottom surface of front header body 67 is provided on each side with a header guide 70, only one of which will be described. Header guide 70 has on its top surface a protruding lug 72 which extends into cavity 69 on the bottom surface of front header body 67. The top surface of header guide 70 also has shoulder 74 that defines shelf 75, which fits underneath the bottom surface of support flange 40 of side rail 30. The header guides 70 on each side of front header body 67 thereby prevent front header apparatus 65 from slipping off support flanges 40, and further maintain front header body 67 in a substantially parallel position across truck box 10, even as the longitudinal position of front header body 67 is adjusted as discussed below.

A tension control assembly 80 is disposed behind each side of front header body 67. Only one such tension control assembly 80 will be described herein, it being understood that the other tension control assembly is essentially a mirror image. Tension control assembly 80 includes a bracket 82 fixedly mounted to support flange 40 of side rail 30 by means such as bolt 84. Bracket 82 includes internally threaded collar member 86 in which is mounted spring plunger 88. Bracket 82 and internally threaded collar member can be formed as separate elements, or can advantageously be formed as a one-piece extrusion. Spring plunger 88 comprises externally threaded cylinder 92, the threads of which mate wit the intenal threads of collar member 86. Seated within the rear end of threaded cylinder 92 is a spring (not shown) which at its forward end engages the rear of nose 89. The front of nose 89 engages rearward projection 66 extending from front header body 67. A slot 90 on the rear end of cylinder 92 receives a screwdriver for manual adjustments.

Figure 7A:
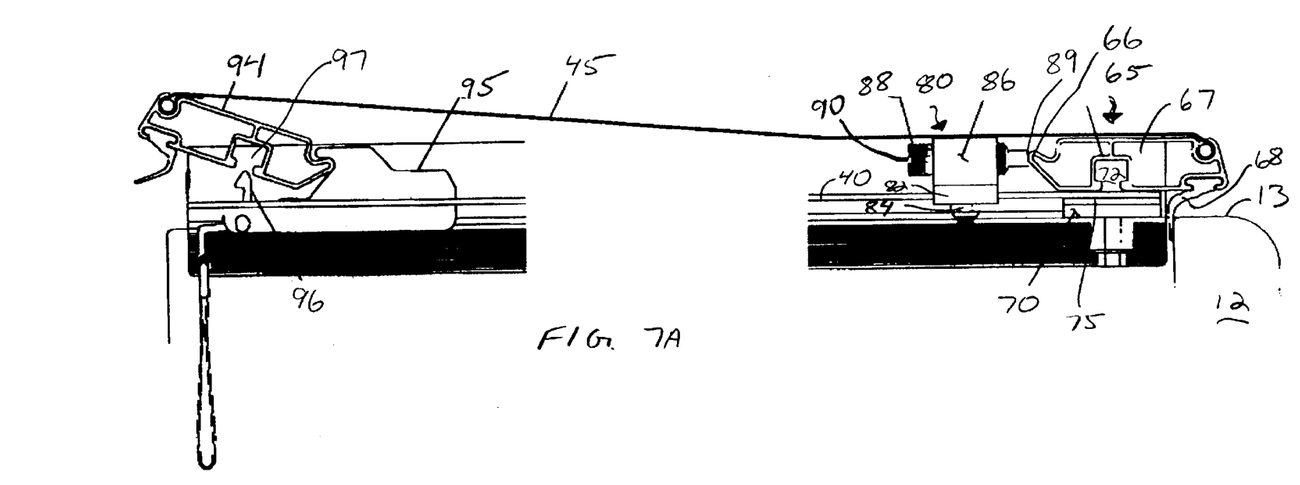
FIG. 7A is a side cross-sectional view of the front header apparatus showing engagement by the tension control assembly before the rear header is locked in position.
Figure 7B:
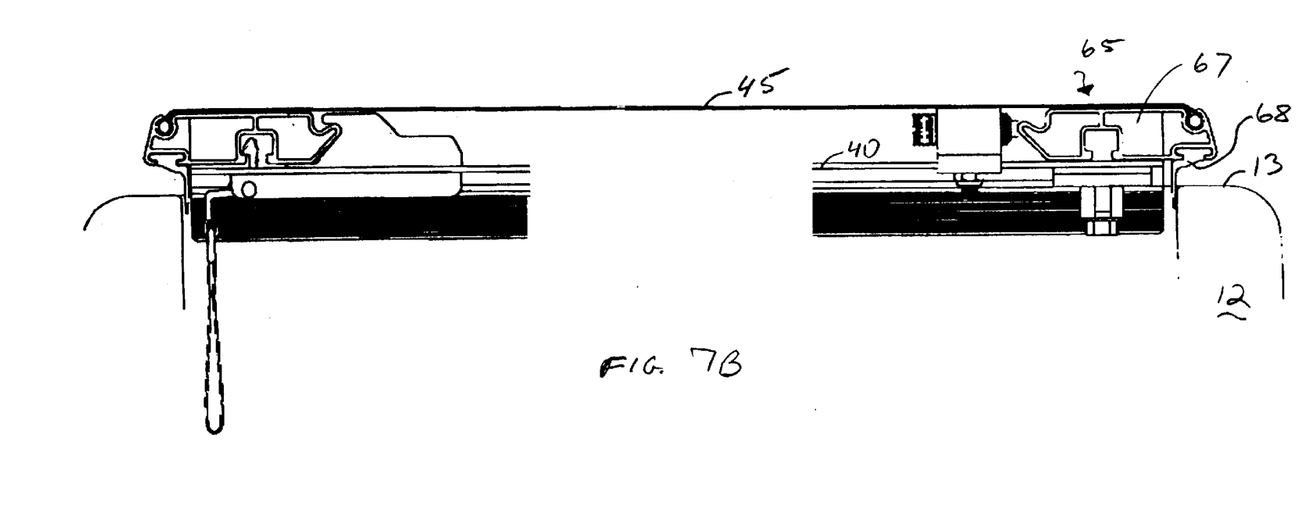
FIG. 7B is a side cross-sectional view of the front header apparatus showing engagement by the tension control assembly after the rear header is locked in position.

In operation, the cover system is unrolled and rear header 94, to which the rear edge of flexible material 45 is permanently affixed, is positioned over rear header stop 95. The user presses down on rear header 94 until toggle 96 is fully engaged within recess 97 on the underside of rear header 94. Rotation of rear header 94 during closing will pre-tension flexible cover 45 by means of spring plunger 88. With the cover completely closed, the flexible material 45 is constantly in tension, and spring plunger 88 provides a forwardly directed linear force to maintain the flexible material 45 in a taut condition. Spring plunger 88 is also manually adjustable by using a screw driver in slot 90 to turn externally threaded cylinder 92, to advance or retract spring plunger 88 to the needs and desires of a particular user. The tension also can be adjusted to accommodate expansion or contraction of the materials of the cover system in response to climactic conditions. As the tension is controlled by tension control assembly 80, either automatically by virtue of the inherent operation of spring plunger 88 or manually by adjustments as hereinbefore described, front header apparatus 65 will ride either slightly forward or slightly back along support flanges 40 to achieve the desired tension. In a preferred embodiment, each tension control assembly can be adjusted by as much as 0.5 inch, and provides a force of up to 80 lbs. The two tension control assemblies on either side of the front header apparatus together provide a force of up to 160 lbs.

The foregoing description of a preferred embodiment of the instant invention is intended by way of illustration and not by way of limitation. Other modification, adaptations, and equivalents as will be apparent to those of skill in the art are intended to be encompassed within the scope of the following claims.

I claim:

1. A cover system for an open top container or truck box, the open top container or truck box having a front wall, a rear wall, and to side walls, the system comprising:

a flexible cover material, the dimensions of which are approximately the same as the dimensions of the open top, said flexible cover material having an upwardly facing surface and a downwardly facing surface, a first fastening means disposed along at least a portion of two side edges of said downwardly facing surface of said flexible cover material, a side rail capable of being mounted adjacent a top edge of at least one of said walls, said side rail having an outwardly facing surface defining a channel portion, and a second fastening means comprising a fastening surface fixedly attached to an elongated substantially rigid slat, said fastening surface being capable of reversible attachment to said first fastening means, said second fastening means being received in sliding engagement within said channel portion, whereby when said flexible cover material is spread over said open top container or truck box, said first fastening means and said fastening surface of said second fastening means face one another and act to secure at least part of the cover material to at least part of the rail when actuated.

2. The cover system of claim 1 wherein said first fastening means comprises strips of loop bearing material permanently affixed to said flexible cover material, and said second fastening means comprises strips of hook bearing material bonded to substantially rigid support strips.

3. The cover system of claim 1 wherein said first fastening means comprises strips of hook bearing material permanently affixed to said flexible cover material, and said second fastening means comprises strips of loop bearing material bonded to substantially rigid support strips.

4. The cover system of claim 1 wherein said side rails are extruded aluminum.

5. The cover system of claim 1 wherein said side rails further comprise a mounting flange.

6. The cover system of claim 5 wherein said mounting flanges of said side rail are secured to the rim of the open top by clamps.

7. The cover system of claim 1 wherein said channel portion is substantially vertical.

8. In a cover system for an open top container or truck box, the system comprising a flexible cover having dimensions approximately the same as the open top, the flexible cover material having an upwardly facing surface and a downwardly facing surface, the flexible cover material having strips of first fastening material disposed along at least a portion of two side edges of the downwardly facing surface, the open top container having strips of second fastening material mounted on a side rail substantially at a top edge of a wall of the container or truck box, said first fastening material and said second fastening material being engageable with one another to securely fasten said cover to said open top, the improvement comprising said second fastening material being bonded to a substantially rigid elongated slat received in sliding engagement within a channel on the side rail.

9. The cover system of claim 8 wherein said elongated slat is fixedly secured to said channel.

10. A cover system for an open top container or truck box, the open top container or truck box having a front wall, a rear wall, and two side walls, the system comprising:
- a flexible cover material, the dimensions of which are approximately the same as the dimensions of the open top, said flexible cover material having an upwardly facing surface and a downwardly facing surface,
- a first fastening means disposed along at least a portion of two side edges of said downwardly facing surface of said flexible cover material, said first fastening means comprising one member of a hook and loop type fastening material,
- a side rail capable of being mounted adjacent a top edge of at least one of said walls, said side rail having an outwardly facing surface defining a channel portion, and
- a second fastening means capable of reversible attachment to said first fastening means, said second fastening means being received in sliding engagement in said channel portion, said second fastening means comprising a member of hook and loop type fastening material capable of releasable attachment to said first fastening means, whereby when said flexible cover material is spread over said open container or truck box, said first fastening means and said fastening surface of said second fastening means face one another and act to secure at least part of the cover material to at least part of the rail when actuated.

* * * * *